US009325245B2

(12) United States Patent
Lin

(10) Patent No.: US 9,325,245 B2
(45) Date of Patent: Apr. 26, 2016

(54) BIDIRECTIONAL ISOLATED DC-DC CONVERTER

(71) Applicant: Dongguan PowerWise New Energy Co., Ltd., Dongguan, Guangdong (CN)

(72) Inventor: Tiansheng Lin, Dongguan (CN)

(73) Assignee: Dongguan PowerWise New Energy Co., Ltd (CN)

( * ) Notice: Subject to any disclaimer, the term of this patent is extended or adjusted under 35 U.S.C. 154(b) by 62 days.

(21) Appl. No.: 14/261,431

(22) Filed: Apr. 25, 2014

(65) Prior Publication Data

US 2015/0244271 A1 Aug. 27, 2015

(30) Foreign Application Priority Data

Feb. 21, 2014 (CN) .......................... 2014 1 00607550

(51) Int. Cl.
*H02M 3/335* (2006.01)
*H02M 1/44* (2007.01)

(52) U.S. Cl.
CPC ............ *H02M 3/33507* (2013.01); *H02M 1/44* (2013.01); *H02M 3/33584* (2013.01)

(58) Field of Classification Search
CPC H02M 3/33507; H02M 1/44; H02M 3/33584
USPC ...................................... 363/17, 21.04–21.18
See application file for complete search history.

(56) References Cited

U.S. PATENT DOCUMENTS

| 8,154,236 | B2* | 4/2012 | Kimura | H02M 7/4807 318/400.26 |
|---|---|---|---|---|
| 2005/0270001 | A1* | 12/2005 | Jitaru | H02M 3/3385 323/247 |
| 2006/0132102 | A1* | 6/2006 | Harvey | G05F 1/67 320/166 |
| 2008/0013351 | A1* | 1/2008 | Alexander | H02M 3/1582 363/123 |
| 2010/0244775 | A1* | 9/2010 | Smith | H02M 3/33584 320/140 |

* cited by examiner

*Primary Examiner* — Jue Zhang
(74) *Attorney, Agent, or Firm* — Wiersch IP Law

(57) ABSTRACT

The present disclosure discloses a bidirectional isolated DC-DC converter, which includes two ports, two voltage and current isolated acquisition units, a processing module, two filtering-circuit units, and a bidirectional power-converting module. One of the two ports is selectively used as an input terminal of the bidirectional isolated DC-DC converter, and another of the two ports is used as an output terminal. The two voltage and current isolated acquisition units are connected with the two ports respectively to sample voltages and currents at the two ports and generate corresponding feedback signals. The processing module receives the feedback signals and outputs corresponding control signals according to the feedback signals. The bidirectional power-converting module is connected via the two voltage and current isolated acquisition units to the two ports to perform the conversion of different voltages between the two ports according to the control signals output by the processing module.

19 Claims, 4 Drawing Sheets

BIDIRECTIONAL ISOLATED DC-DC CONVERTER

FIELD

The present disclosure relates to a voltage converting apparatus, and particularly, to a bidirectional isolated DC-DC (direct current to direct current) converter applicable to new energy automobiles and energy storage systems.

BACKGROUND

In high-voltage battery packs of new energy automobiles and energy storage systems, effective balancing must be performed among individual batteries connected in series in the high-voltage battery packs in order to ensure that the battery system has sufficient charging and discharging energy and to prolong the service life of the battery packs. Most of the balancing technologies currently available achieve the passive discharging balance by means of discharging via a resistor. This is a kind of unidirectional energy-consuming balancing approach, which has a small balancing current (this has a high requirement on consistency among the individual batteries themselves) and causes heat generation.

Currently, bidirectional isolated DC-DC converter apparatuses are mainly used in solar energy storage control systems, and motor driving and energy feedback systems of electromobiles, and most of them adopt a single-chip microcontroller or a digital signal processor (DSP) for perform the control and adopt a transformer for perform the isolated voltage-transformation so as to achieve the bidirectional energy transferring.

China Patent CN201120283402.9 discloses a bidirectional DC-DC converter, which comprises a current detecting circuit, a voltage detecting circuit, a controller module, a pulse width modulating circuit and a high-frequency dual-ratio transformer, and is applicable to systems in which the charging and discharging DC/DC voltages which are varied greatly. However, the circuit of this kind of DC-DC converter adopts high turn ratios and suspended windings, and it leads to a large leakage inductance and parasitic parameters, which tends to cause electromagnetic compatibility problems. Furthermore, the aforesaid bidirectional DC-DC converter adopts multi-path change-over switches, which make both the structure and the control complex.

China Patent CN201210488856.9 discloses a bidirectional DC-DC converter, which comprises a power-converting unit, an input-voltage sampling unit, an output-voltage sampling unit, a current sampling and processing unit, a PWM controlling unit and a function controlling unit. However, this kind of bidirectional DC-DC converter is only applicable to perform the charging and discharging balance among battery units in a high-voltage battery pack and is only able to achieve a constant current at one side instead of at both sides. Furthermore, when a high turn ratio is needed, a two-step voltage boosting mode must be adopted in the bidirectional DC-DC converter, which tends to introduce the electromagnetic compatibility problems and makes both the structure and the control complex. During the DC-DC converting process, high-frequency signals tend to interfere with the functional controlling unit to affect the reliability of the whole system.

Accordingly, it is necessary to provide a novel bidirectional isolated DC-DC converter to solve the aforesaid problems.

SUMMARY

The present disclosure relates to a novel bidirectional isolated DC-DC converter, which features a simple structure, wider applicability, better utility, better interference immunity and higher reliability.

The present disclosure provides a bidirectional isolated DC-DC converter, which comprises a first port, a second port, a first voltage and current isolated acquisition unit, a second voltage and current isolated acquisition unit, a processing module, a first filtering-circuit unit, a second filtering-circuit unit, and a bidirectional power-converting module. One of the first port and the second port is selectively used as an input terminal of the bidirectional isolated DC-DC converter, and another of the first port and the second port is used as an output terminal of the bidirectional isolated DC-DC converter correspondingly. The first voltage and current isolated acquisition unit is connected with the first port to sample voltages and currents at the first port and generate a corresponding feedback signal. The second voltage and current isolated acquisition unit is connected with the second port to sample voltages and a currents at the second port and generate another corresponding feedback signal. The processing module is connected with the first voltage and current isolated acquisition unit and the second voltage and current isolated acquisition unit to receive feedback signals generated by the first voltage and current isolated acquisition unit and the second voltage and current isolated acquisition unit and output corresponding control signals according to the feedback signals. The first filtering-circuit unit is connected to the first port via the first voltage and current isolated acquisition unit. The second filtering-circuit unit is connected to the second port via the second voltage and current isolated acquisition unit. The bidirectional power-converting module is connected with the processing module, connected via the first filtering-circuit unit and the first voltage and current isolated acquisition unit to the first port, and connected via the second filtering-circuit unit and the second voltage and current isolated acquisition unit to the second port, and configured to perform the conversion of different voltages between the first port and the second port according to the control signals outputted from the processing module.

Preferably, the bidirectional isolated DC-DC converter further comprises a first electromagnetic interference filter unit and a second electromagnetic interference filter unit. The first electromagnetic interference filter unit is connected between the first port and the first voltage and current isolated acquisition unit; and the second electromagnetic interference filter unit is connected between the second port and the second voltage and current isolated acquisition unit.

Preferably, the bidirectional power-converting module comprises a transformer, a first switch assembly, a second switch assembly, a first control switch, a first driving unit, a first diode, a second control switch, a second driving unit and a second diode. The transformer at least comprises a first pair of windings and a second pair of windings, wherein the first pair of windings comprises a first left-side winding and a first right-side winding, and the second pair of windings comprises a second left-side winding and a second right-side winding. The first switch assembly is configured to control whether the first pair of windings operates, wherein the first switch assembly comprises a first left-path switch and a first right-path switch, a terminal of the first left-side winding of the first pair of windings is connected to the first filtering-circuit unit via the first left-path switch, and a terminal of the first right-side winding of the first pair of windings is connected to the second filtering-circuit unit via the first right-path switch. The second switch assembly is configured to control whether the second pair of windings operates, wherein the second switch assembly comprises a second left-path switch and a second right-path switch, a terminal of the second left-side winding of the second pair of windings is connected to the first filtering-circuit unit via the second left-path switch, and a terminal of the second right-side winding of the second pair of windings is connected to the second filtering-circuit unit via the second right-path switch. The first control switch comprises a first route terminal, a second route terminal and a control terminal, wherein another terminal of the first left-side winding of the first pair of windings and another terminal of the second left-side winding of the second pair of windings are connected to the first route terminal of the first control switch respectively, and the second route terminal of the first control switch is grounded. The first driving unit is connected with the control terminal of the first control switch to control whether turning on a path between the first route terminal and the second route terminal of the first control switch. The first diode is connected in anti-parallel between the first route terminal and the second route terminal of the first control switch. The second control switch comprises a first route terminal, a second route terminal and a control terminal, wherein another terminal of the first right-side winding of the first pair of windings and another terminal of the second right-side winding of the second pair of windings are connected to the first route terminal of the second control switch respectively, and the second route terminal of the second control switch is grounded. The second driving unit is connected with the control terminal of the second control switch to control whether turning on a path between the first route terminal and the second route terminal of the second control switch. The second diode is connected in anti-parallel between the first route terminal and the second route terminal of the second control switch. The control signals output by the processing module comprise a first pair of control signals, a second pair of control signals, a first pulse width modulation (PWM) signal and a second PWM signal. The first switch assembly receives the first pair of control signals to control whether the first pair of windings operates, and the second switch assembly receives the second pair of control signals to control whether the second pair of windings operates. The first driving unit receives the first PWM signal to control whether turning on a path between the first route terminal and the second route terminal of the first control switch according to the first PWM signal, and the second driving unit receives the second PWM signal to control whether turning on a path between the first route terminal and the second route terminal of the second control switch according to the second PWM signal.

Preferably, the bidirectional power-converting module further comprises a first absorbing unit and a second absorbing unit. The first absorbing unit is connected in parallel between the first route terminal and the second route terminal of the first control switch, and the second absorbing unit is connected in parallel between the first route terminal and the second route terminal of the second control switch.

Preferably, the processing module comprises a first PWM controlling unit and a second PWM controlling unit. The first PWM controlling unit is connected with the second voltage and current isolated acquisition unit to receive the feedback signal generated by the second voltage and current isolated acquisition unit and output the first PWM signal to the first driving unit. The second PWM controlling unit is connected with the first voltage and current isolated acquisition unit to receive the feedback signal generated by the first voltage and current isolated acquisition unit and output the second PWM signal to the second driving unit.

Preferably, each of the first voltage and current isolated acquisition unit and the second voltage and current isolated acquisition unit comprises a current isolated acquisition unit and a voltage isolated acquisition unit. The current isolated acquisition unit is configured to isolate and sample the current at the first port or the second port and convert the sampled current into an isolated voltage bias signal. The voltage isolated acquisition unit is configured to isolate and sample the voltage at the first port or the second port and convert the sampled voltage into a voltage feedback signal.

Preferably, the current isolated acquisition unit comprises a current sensor based on the Hall effect, and the voltage isolated acquisition unit comprises a first optical coupler, a second optical coupler, a programmable reference source and a third optical coupler. The first optical coupler comprises a light emitting element and an photoelectric switch. One terminal of the light emitting element is connected to a first power source via a first resistor and another terminal thereof is adapted to receive a third control signal. A control terminal of the photoelectric switch is coupled with the light emitting element, a route terminal of the photoelectric switch is connected to a first sampled voltage and another route terminal thereof is grounded via a second resistor and a third resistor, wherein another route terminal is used as a first node, and a connection between the second resistor and the third resistor is used as a second node. The second optical coupler comprises a light emitting element and an photoelectric switch. One terminal of the light emitting element is connected to the first power source via a fourth resistor and another terminal thereof is adapted to receive a fourth control signal. A control terminal of the photoelectric switch is coupled with the light emitting element, a route terminal of the photoelectric switch is connected to the second node and another route terminal thereof is grounded via a fifth resistor. A terminal of the programmable reference source is connected to the first node via a sixth resistor, another terminal thereof is grounded, and a control terminal of the programmable reference source is connected to the second node. The third optical coupler comprises a light emitting element and an photoelectric switch. One terminal of the light emitting element is connected to the first node via a seventh resistor, and another terminal thereof is connected to a connection between the sixth resistor and the programmable reference source. A control terminal of the photoelectric switch is coupled with the light emitting element, one route terminal of the photoelectric switch is connected via an eighth resistor to a fixed reference voltage generated by the first PWM controlling unit or the second PWM controlling unit, and another route terminal thereof is grounded via a ninth resistor and used as an output terminal of the voltage isolated acquisition unit to output the voltage feedback signal.

Preferably, each of the first PWM controlling unit and the second PWM controlling unit comprises a PWM controller, and the PWM controller has two error amplifiers integrated therein and is adapted to provide the fixed reference voltage.

Preferably, each of the first left-path switch and the first right-path switch of the first switch assembly comprises a fourth optical coupler and a switch element. The fourth optical coupler comprises a light emitting element and an photoelectric switch. One terminal of the light emitting element is connected to the first power source via an eleventh resistor, and another terminal thereof is adapted to receive a corresponding control signal from the first pair of control signals. A control terminal of the photoelectric switch is coupled with the light emitting element, one route terminal of the photoelectric switch is grounded, another route terminal thereof is connected via a twelfth resistor and a thirteenth resistor to the first filtering-circuit unit or the second filtering-circuit unit as a port of the bidirectional power-converting module. A control terminal of the switch element is connected to a node between the twelfth resistor and the thirteenth resistor, a route terminal of the switch element is connected to the first filtering-circuit unit or the second filtering-circuit unit, and another route terminal is connected to a terminal of the first left-side winding or the first right-side winding of the first pair of windings.

Preferably, each of the second left-path switch and the second right-path switch in the second switch assembly comprises a relay and a switch element. The relay is connected between the first filtering-circuit unit or the second filtering-circuit unit and the second left-side winding or the second right-side winding of the second pair of windings. A control terminal of the switch element is adapted to receive a corresponding control signal from the second pair of control signals, one route terminal of the switch element is grounded and another route terminal thereof is connected to the relay.

The present disclosure also provides a bidirectional isolated DC-DC converter, which comprises two ports, two voltage and current isolated acquisition units, a processing module and a bidirectional power-converting module. One of the two ports is selectively used as an input terminal of the bidirectional isolated DC-DC converter, and another of the two ports is used as an output terminal of the bidirectional isolated DC-DC converter correspondingly. The two voltage and current isolated acquisition units are connected with the two ports respectively, to sample voltages and currents at the two ports and generate corresponding feedback signals respectively. The processing module is connected with the two voltage and current isolated acquisition units, to receive the feedback signals generated from the two voltage and current isolated acquisition units, and output corresponding control signals according to the feedback signals. The bidirectional power-converting module is connected with the processing module, and connected to the two ports via the two voltage and current isolated acquisition units respectively, wherein the bidirectional power-converting module is configured to perform the conversion of different voltages between the two ports according to the control signals outputted from the processing module. The two ports and the two voltage and current isolated acquisition units are symmetric respectively with respect to the bidirectional power-converting module.

Preferably, the bidirectional isolated DC-DC converter further comprises two filtering-circuit units and two electromagnetic interface units. The two filtering-circuit units are connected to the two ports via the two voltage and current isolated acquisition units respectively. The two electromagnetic interference filter units are connected between the two ports and the two voltage and current isolated acquisition unit respectively.

Preferably, the bidirectional power-converting module comprises a transformer, two left-path switches, two right-path switches, two control switches, two driving units, and two diodes. The transformer at least comprises two left-side windings and two right-side windings, the two left-side windings are magnetically-coupled with the two right-side windings respectively. Each of the two left-path switches has one terminal connected to one terminal of a corresponding one of the two left-side windings respectively, and another terminal connected to one of the two filtering-circuit units. Each of the two right-path switches has one terminal connected to one terminal of a corresponding one of the two right-side winding respectively, and another terminal connected to another of the two filtering-circuit units. Each of the two control switches comprises two route terminals and a control terminal, wherein another terminals of the two left-side windings are connected together and connected to one route terminal of a corresponding one of the two control switches, another terminals of the two right-side windings are connected together and connected to one route terminal of another of the two control switches, and another route terminals of the two control switches are grounded respectively. Two driving units are connected to control terminals of the two control switches respectively, to control whether the two control switches are turned on respectively. The two diodes are connected in anti-parallel between the two router terminals of the two control switches respectively. The two left-side windings are symmetric with the two right-side windings respectively, the two left-path switches are symmetric with the two right-path switches. The two control switches, the two driving units and the two diodes are symmetric respectively. The control signals outputted from the processing module at least two left control signals, two right control signals, and two pulse width modulation (PWM) signals; the two left control signals are transmitted to the two left-path switches respectively to control whether the two left-path switches are turned on respectively, and the two left control signals are opposite with each other; the two right control signals are transmitted to the two right-path switches respectively to control whether the two right-path switches are turned on respectively, and the two right control signals are opposite with each other; and the two PWM signals are transmitted to the two driving units respectively such that the two driving units control whether the two control switches are turned on respectively according to the two PWM signals respectively.

Preferably, the bidirectional power-converting module further comprises two absorbing units, connected in parallel between the two terminals of the two control switches respectively.

Preferably, the processing module comprises two PWM controlling unit, connected with the two voltage and current isolated acquisition unit respectively, to receive the feedback signals generated by the two voltage and current isolated acquisition units respectively and output the two PWM signals to the two driving units respectively.

The present disclosure has following benefits: as compared to the prior art, the bidirectional isolated DC-DC converter has a symmetric structural design and a very simple and artful structure, and is compatible with voltage conversion between battery units within a high-voltage battery pack and voltage conversion between high-voltage battery packs connected in series or voltage conversion between a high-voltage battery pack and an auxiliary power source, so it has wider applicability. Furthermore, the bidirectional isolated DC-DC converter of the present disclosure can achieve a constant voltage and a constant current at both sides, and can automatically change the constant voltage value and the constant current value depending on the needs, so it has better utility. Moreover, not only the input end and the output end thereof are isolated, the associated sampling unit and the controlling unit are also isolated, so the interference immunity and the reliability become higher and the electromagnetic compatibility is improved.

BRIEF DESCRIPTION OF THE DRAWINGS

Hereinbelow, the present disclosure will be further described with reference to the attached drawings and the embodiments thereof, in which.

DETAILED DESCRIPTION

Figure 1:
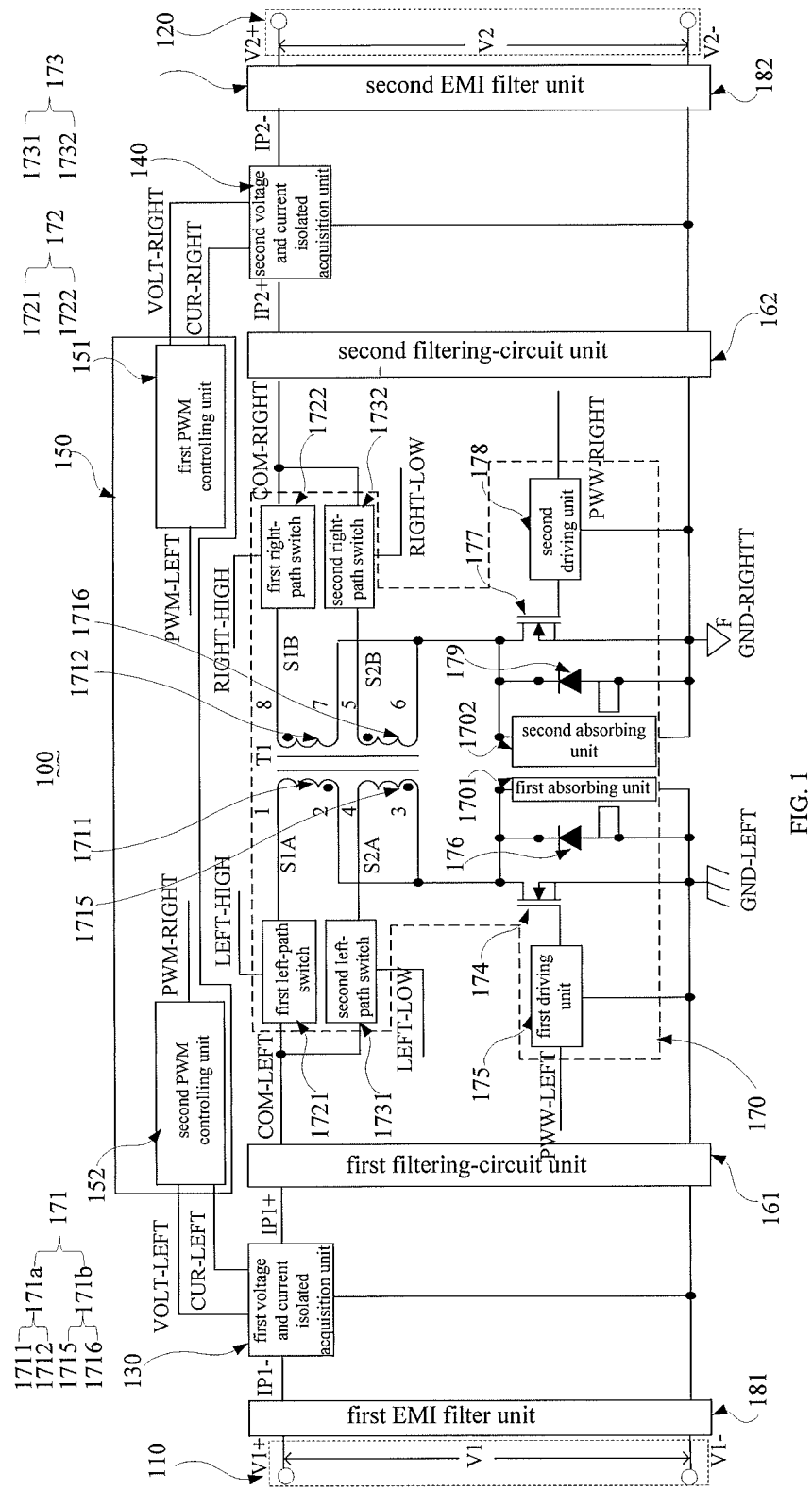
FIG. 1 is a schematic view of a bidirectional isolated DC-DC converter according to an embodiment of the present disclosure.

Referring to FIG. 1, a schematic view of a bidirectional isolated DC-DC converter according to an embodiment of the present disclosure is shown therein. As shown in FIG. 1, the bidirectional isolated DC-DC converter 100 of the present disclosure comprises a first port 110, a second port 120, a first voltage and current isolated acquisition unit 130, a second voltage and current isolated acquisition unit 140, a processing module 150, a first filtering-circuit unit 161, a second filtering-circuit unit 162, and a bidirectional power-converting module 170.

One of the first port 110 and the second port 120 is selectively used as an input terminal of the bidirectional isolated DC-DC converter 100, and another of the first port 110 and the second port 120 is used as an output terminal of the bidirectional isolated DC-DC converter 100 correspondingly. That is, when the first port 110 is used as the input terminal, the second port 120 is used as the output terminal; and when the second port 120 is used as the input terminal, the first port 110 is used as the output terminal.

The first voltage and current isolated acquisition unit 130 is connected with the first port 110 to sample voltages and currents at the first port 110 and generate a corresponding feedback signal. The second voltage and current isolated acquisition unit 140 is connected with the second port 120 to sample voltages and currents at the second port 120 and generate a corresponding feedback signal.

The processing module 150 is connected with the first voltage and current isolated acquisition unit 130 and the second voltage and current isolated acquisition unit 140 to receive the feedback signals generated by the first voltage and current isolated acquisition unit 130 and the second voltage and current isolated acquisition unit 140 and output corresponding control signals according to the feedback signals. In the present disclosure, the processing module 150 may be an embedded processing module (e.g., Micro Controller Unit (MCU), Central Processing Unit (CPU) or ARM processor) having embedded software as a core, and peripheral circuits thereof may be flexibly disposed depending on the needs.

The first filtering-circuit unit 161 is connected to the first port 110 via the first voltage and current isolated acquisition unit 130, and the second filtering-circuit unit 162 is connected to the second port 120 via the second voltage and current isolated acquisition unit 140. Each of the first filtering-circuit unit 161 and the second filtering-circuit unit 162 may be performed by a capacitor filtering circuit or an LC filtering circuit or a π filtering circuit.

The bidirectional power-converting module 170 is connected with the processing module 150, connected to the first port 110 via the first filtering-circuit unit 161 and the first voltage and current isolated acquisition unit 130, and connected to the second port 120 via the second filtering-circuit unit 162 and the second voltage and current isolated acquisition unit 140. The bidirectional power-converting module 170 may perform the conversion of different voltages between the first port 110 and the second port 120 according to the control signals outputted from the processing module 150.

Specifically, the bidirectional power-converting module 170 may be a bidirectional isolated flyback power source structure which comprises a transformer 171, a first switch assembly 172, a second switch assembly 173, a first control switch 174, a first driving unit 175, a first diode 176, a second control switch 177, a second driving unit 178 and a second diode 179.

The transformer 171 at least comprises a first pair of windings 171a and a second pair of windings 171b, wherein the first pair of windings 171a comprises a first left-side winding 1711 and a first right-side winding 1712, and the second pair of windings 171b comprises a second left-side winding 1715 and a second right-side winding 1716. The turn ratio between the first left-side winding 1711 and the first right-side winding 1712 of the first pair of windings 171a may be set to 1, and the turn ratio between the second left-side winding 1715 and the second right-side winding 1716 of the second pair of windings 171b may also be set to 1.

The first switch assembly 172 is configured to control whether the first pair of windings 171a operates and comprises a first left-path switch 1721 and a first right-path switch 1722. A terminal of the first left-side winding 1711 of the first pair of windings 171a is connected to the first filtering-circuit unit 161 via the first left-path switch 1721, and a terminal of the first right-side winding 1712 of the first pair of windings 171a is connected to the second filtering-circuit unit 162 via the first right-path switch 1722.

The second switch assembly 173 is configured to control whether the second pair of windings 171b operates and comprises a second left-path switch 1731 and a second right-path switch 1732. A terminal of the second left-side winding 1715 of the second pair of windings 171b is connected to the first filtering-circuit unit 161 via the second left-path switch 1731, and a terminal of the second right-side winding 1716 of the second pair of windings 171b is connected to the second filtering-circuit unit 162 via the second right-path switch 1732.

The first control switch 174 comprises a first route terminal, a second route terminal and a control terminal. Another terminal of the first left-side winding 1711 of the first pair of windings 171a and another terminal of the second left-side winding 1715 of the second pair of windings 171b are connected together and connected to the first route terminal of the first control switch 174 respectively, and the second route terminal of the first control switch 174 is grounded.

The first driving unit 175 is connected with the control terminal of the first control switch 174 to control whether turning on a path between the first route terminal and the second route terminal of the first control switch 174. In this embodiment, the first control switch 174 may be implemented by a PMOS transistor, of which a gate is used as the control terminal, a source/drain is used as the first route terminal and another source/drain is used as the second route terminal.

The first diode 176 is connected in anti-parallel between the first route terminal and the second route terminal of the first control switch 174.

Similarly, the second control switch 177 comprises a first route terminal, a second route terminal and a control terminal. Another terminal of the first right-side winding 1712 of the first pair of windings 171a and another terminal of the second right-side winding 1716 of the second pair of windings 171b are connected to the first route terminal of the second control switch 177 respectively, and the second route terminal of the second control switch 177 is grounded.

The second driving unit 178 is connected with the control terminal of the second control switch 177 to control turning on a path between the first route terminal and the second route terminal of the second control switch 177. In this embodiment, the second control switch 177 may also be implemented by a PMOS transistor, of which a gate is used as the control terminal, a source/drain is used as the first route terminal and another source/drain is used as the second route terminal.

The second diode 179 is connected in anti-parallel between the first route terminal and the second route terminal of the second control switch 177.

Furthermore, in the present disclosure, the bidirectional power-converting module 170 further comprises a first absorbing unit 1701 and a second absorbing unit 1702. The first absorbing unit 1701 is connected in parallel between the first route terminal and the second route terminal of the first control switch 174, and the second absorbing unit is connected in parallel between the first route terminal and the second route terminal of the second control switch 177. Each of the first absorbing unit 1701 and the second absorbing unit 1702 may adopt an RC absorbing circuit or an RCD absorbing circuit.

The first left-path switch 1721 and the first right-path switch 1722 of the first switch assembly 172 may be switch circuits based on PMOS transistors or switch circuits based on relays. Correspondingly, the second left-path switch 1731 and the second right-path switch 1732 of the first switch assembly 173 are switch circuits based on relays or switch circuits based on PMOS transistors. Each of the first driving unit 175 and the second driving unit 178 may adopt the combination of non-polar capacitors or the combination of a bus buffer and a non-polar capacitor or the combination of isolated driving chips.

The control signals output by the processing module 150 comprise a first pair of control signals, a second pair of control signals, a first pulse width modulation signal PWM-LEFT and a second pulse width modulation signal PMW-RIGHT. The first pair of control signals comprises a first left-side control signal LEFT_HIGH and a first right-side control signal RIGHT_HIGH. The first left-path switch 1721 and the first right-path switch 1722 of the first switch assembly 172 receive the first left-side control signal LEFT_HIGH and the first right-side control signal RIGHT_HIGH of the first pair of control signals respectively to control whether the first pair of windings 171a operates. The second pair of control signals comprises a second left-side control signal LEFT_LOW and a second right-side control signal RIGHT_LOW. The second left-path switch 1731 and the second right-path switch 1732 of the second switch assembly 173 receive the second left-side control signal LEFT_LOW and the second right-side control signal RIGHT_LOW of the second pair of control signals respectively to control whether the second pair of windings 171b operates. The first left-path switch 1721 and the first right-path switch 1722 of the first switch assembly 172 are turned on or turned off simultaneously to cause the first kind of voltage change, e.g., to change the voltage between any one of the battery packs connected in series and an auxiliary power source. The second left-path switch 1731 and the second right-path switch 1732 of the second switch assembly 173 are turned on or turned off simultaneously to cause the second kind of voltage change, e.g., to change the voltage between individual batteries in a battery pack.

The first driving unit 175 receives the first pulse width modulation signal PWM_LEFT output by the processing module 150 to control whether turning on the path between the first route terminal and the second route terminal of the first control switch 174 according to the first pulse width modulation signal PWM_LEFT. The second driving unit 178 receives the second pulse width modulation signal PWM_RIGHT output by the processing module 150 to control whether turning on the path between the first route terminal and the second route terminal of the second control switch 177 according to the second pulse width modulation signal PWM_RIGHT.

In this embodiment, the processing module 150 comprises a first pulse width modulation (PWM) controlling unit 151 and a second PWM controlling unit 152. The first PWM controlling unit 151 is connected with the second voltage and current isolated acquisition unit 162 to receive the feedback signal generated by the second voltage and current isolated acquisition unit and output the first pulse width modulation signal PWM_LEFT to the first driving unit 175. The second PWM controlling unit 152 is connected with the first voltage and current isolated acquisition unit 161 to receive the feedback signal generated by the first voltage and current isolated acquisition unit 161 and output the second pulse width modulation signal PWM_RIGHT to the second driving unit 178. Preferably, each of the first PWM controlling unit 151 and the second PWM controlling unit 152 may comprise an independent PWM controller, and the PWM controller has two error amplifiers integrated therein and is adapted to provide the fixed reference voltage, wherein the PWM controller may adopt the commonly used TL594 PWM controller. Moreover, the feedback signals generated by the first voltage and current isolated acquisition unit 161 comprise a voltage bias signal CUR_LEFT and a voltage feedback signal VOLT_LEFT. Correspondingly, the feedback signals generated by the second voltage and current isolated acquisition unit 162 comprise a voltage bias signal CUR_RIGHT and a voltage feedback signal VOLT_RIGHT.

Preferably, the bidirectional isolated DC-DC converter 100 of the present disclosure further comprises a first electromagnetic interference (EMI) filter unit 181 and a second EMI filter unit 182. The first EMI filter unit 181 is connected between the first port 110 and the first voltage and current isolated acquisition unit 130, i.e., the first voltage and current isolated acquisition unit 130 is connected to the first port 110 via the first EMI filter unit 181. Similarly, the second EMI filter unit 182 is connected between the second port 120 and the second voltage and current isolated acquisition unit 140, i.e., the second voltage and current isolated acquisition unit 140 is connected to the second port 120 via the second EMI filter unit 182. The first EMI filter unit 181 and the second EMI filter unit 182 may adopt discrete common-mode inductors, or devices having common-mode inductors and differential-mode inductors integrated therein.

As shown in FIG. 1, the main structures of the bidirectional isolated DC-DC converter 100 of the present disclosure are symmetric. For example, the first EMI filter unit 181 is symmetric with the second EMI filter unit 182; the first filtering-circuit unit 161 is symmetric with the second filtering-circuit unit 162; the first voltage and current isolated acquisition unit 130 is symmetric with the second voltage and current isolated acquisition unit 140; the first PWM controlling unit 151 and the second PWM controlling unit 152 of the processing module 150 are symmetric with each other; the first absorbing unit 1701 and the second absorbing unit 1702 of the bidirectional power-converting module 170 are symmetric with each other; the first driving unit 175 is symmetric with the second driving unit 175; the first left-path switch 1721 and the first right-path switch 1722 of the first switch assembly 172 are symmetric with each other; the second left-path switch 1731 and the second right-path switch 1732 of the second switch assembly 173 are symmetric with each other, and so on. Therefore, the bidirectional isolated DC-DC converter 100 of the present disclosure has a very simple circuit structure.

The operational principal of the bidirectional isolated DC-DC converter 100 of the present disclosure will be described in detail hereinafter.

During the first kind of voltage conversion, e.g., the voltage conversion between any one of the battery packs connected in series and an auxiliary power source, if the first port 110 is used as an input terminal and the second port 120 is used as an output terminal (i.e., energy is transferred from the first port 110 to the second port 120), the input terminal voltage V1 at the first port 110 is used as an input terminal voltage and the voltage V2 at the second port 120 is used as an output terminal voltage. Thus, the high potential V1+ of the voltage V1 at the first port 110 is applied to the port COM_LEFT of the bidirectional power-converting module 170 via the first EMI filter unit 181, the first voltage and current isolated acquisition unit 130, and the first filtering-circuit unit 161.

The first left-side control signal LEFT_HIGH and the first right_side control signal RIGHT_HIGH of the first pair of control signals sent by the processing module 150 are enabled simultaneously, i.e., the first left-side control signal LEFT_HIGH and the first right_side control signal RIGHT_HIGH of the first pair of control signals are in a low-level state simultaneously, so the first left-path switch 1721 and the first right-path switch 1722 of the first switch assembly 172 are turned on simultaneously. At this point, the second left-side control signal LEFT_LOW and the second right_side control signal RIGHT_LOW of the second pair of control signals sent by the processing module 150 are disabled simultaneously, i.e., the second left-side control signal LEFT_LOW and the second right_side control signal RIGHT_LOW of the second pair of control signals are in a high-level state simultaneously, so the second left-path switch 1731 and the second right-path switch 1732 of the second switch assembly 173 are turned off. Therefore, at this point, the first pair of windings 171a of the transformer 171 is turned on and in a working condition, but the second pair of windings 171b is not turned on and in a non-working condition.

Because the first port 110 is used as the input terminal and the second port 120 is used as the output terminal, the first PWM controlling unit 151 transmits a first pulse width modulation signal PWM_LEFT to the first driving unit 175, but the second PWM controlling unit 152 does not transmit a second pulse width modulation signal PWM_RIGHT to the second driving unit 178.

When the first pulse width modulation signal PWM_LEFT output by the first PWM controlling unit 151 is input into the first driving unit 175, the first driving unit 175 outputs an in-phase PWM signal to drive the first control switch 174 to be alternately turned on or turned off with the same duty cycle. According to the operating principle of the flyback circuit, when the first control switch 174 is turned on, energy is stored into the first left-side winding 1711 of the first pair of windings 171a and the first diode 176 is reversely cut off. Because the second PWM controlling unit 152 does not transmit a second pulse width modulation signal PWM_RIGHT to the second driving unit 178, the second driving unit 178 and the corresponding second control switch 177 keep being turned off. When the first control switch 174 is turned off, the energy stored into the first left-side winding 1711 of the first pair of windings 171a is transmitted to the first right-side winding 1712, and the first right-side winding 1712, the conductive first right-path switch 1722, the second filtering-circuit unit 162, the second voltage and current isolated acquisition unit 140, the second EMI filter unit 182 and the second diode 179 form a continuous current circuit so that the energy is transferred from the first port 110 to the second port 120.

During this process, the first absorbing unit 1701 may absorb the voltage spike, generated by the transformer 171 due to the leakage inductance, when the first control switch 174 is turned off so that the first control switch 174 can operate securely and generation of electromagnetic interference can be avoided.

Moreover, because the duty cycle of the first pulse width modulation signal PWM_LEFT input into the first driving unit 175 is determined by the first PWM controlling unit 151 of the processing module 150, and the first PWM controlling unit 151 is connected to the second voltage and current isolated acquisition unit 140 (which is connected to the second port 120), the second voltage and current isolated acquisition unit 140 acquires the voltage at the second port 120 and the current in the aforesaid continuous current circuit, inputs the acquired voltage and current into the first PWM controlling unit 151, then compares the acquired voltage and current with the predetermined threshold of the two error amplifiers within the first PWM controlling unit 151. When the voltage and current input into the first PWM controlling unit 151 is higher than the predetermined threshold, the duty cycle of the first pulse width modulation signal PWM_LEFT is reduced; and when the voltage and current input into the first PWM controlling unit 151 is lower than the predetermined threshold, the duty cycle of the first pulse width modulation signal PWM_LEFT is increased. Therefore, by adjusting the duty cycle of the first pulse width modulation signal PWM_LEFT, a constant voltage at the second port 120 and a constant current in the aforesaid continuous current circuit can be achieved.

In the first kind of voltage conversion mode, if the first port 110 is used as an output terminal and the second port 120 is used as an input terminal (i.e., energy is transferred from the second port 120 to the first port 110), the voltage V2 at the second port 120 is used as an input terminal voltage and the voltage V1 at the first port 110 is used as an output terminal voltage. Thus, the high potential V2+ of the input terminal voltage V2 at the second port 120 is applied to the port COM_RIGHT of the bidirectional power-converting module 170 via the second EMI filter unit 182, the second voltage and current isolated acquisition unit 140, and the second filtering-circuit unit 162.

Similarly, when the two control signals of the first pair of control signals sent by the processing module 150 are enabled simultaneously, the two switches of the first switch assembly 172 are turned on simultaneously; and when the two control signals of the second pair of control signals are disabled simultaneously, the two switches of the second switch assembly 172 are turned off. That is, at this point, the first pair of windings 171a of the transformer 171 is in the working condition and the second pair of windings 171b of the transformer 171 is in the non-working condition.

Because the second port 120 is used as the input terminal and the first port 110 is used as the input terminal, the second PWM controlling unit 152 transmits a second pulse width modulation signal PWM_RIGHT to the second driving unit 178, but the first PWM controlling unit 151 does not transmit a first pulse width modulation signal PWM_LEFT to the first driving unit 175.

The second driving unit 178 receives the second pulse width modulation signal PWM_RIGHT, and outputs an in-phase PWM signal to drive the second control switch 177 to be alternately turned on or turned off with the same duty cycle. When the second control switch 177 is turned on, energy is stored into the first right-side winding 1712 of the first pair of windings 171a, and the second diode 179 is reversely cut off. The first driving unit 175 and the corresponding first control switch 174 keep being turned off. When the second control switch 177 is turned off, the energy stored into the first right-side winding 1712 of the first pair of windings 171a is transmitted to the first left-side winding 1711, and the first left-side winding 1711, the conductive first left-path switch 1721, the first filtering-circuit unit 161, the first voltage and current isolated acquisition unit 130, the first EMI filter unit 181 and the first diode 176 form a continuous current circuit so that the energy is transferred from the second port 120 to the first port 110.

Similarly during this process, the second absorbing unit 1702 can absorb the voltage spike, generated by the transformer 171 due to the leakage inductance, when the second control switch 177 is turned off so that the second control switch 177 can operate securely and generation of electromagnetic interference can be avoided.

Furthermore, because the second PWM controlling unit 152 is connected to the first voltage and current isolated acquisition unit 130 (which is connected to the first port 110), the second PWM controlling unit 152 can adjust the duty cycle of the second pulse width modulation signal PWM_RIGHT output to the second driving unit 178 by sampling the voltage and the current at the first port 110 via the first voltage and current isolated acquisition unit 130. In this way, a constant voltage at the first port 110 and a constant current in the related continuous current circuit can be achieved.

The process of the second kind of voltage conversion, e.g., the voltage conversion between individual batteries in a battery pack, is similar to that of the first kind of voltage conversion except that: during the second kind of voltage conversion, the first left-side control signal LEFT_HIGH and the first right-side control signal RIGHT_HIGH of the first pair of control signals output by the processing module 150 are disabled simultaneously so that the two switches of the first switch assembly 172 are turned off; and the second left-side control signal LEFT_LOW and the second right-side control signal RIGHT_LOW of the second pair of control are enabled simultaneously so that the two switches of the second switch assembly 173 are turned on. That is, at this point, the first pair of windings 171a of the transformer 171 is in the non-working condition, and the second pair of windings 171b of the transformer 171 is in the working condition.

Figure 2:
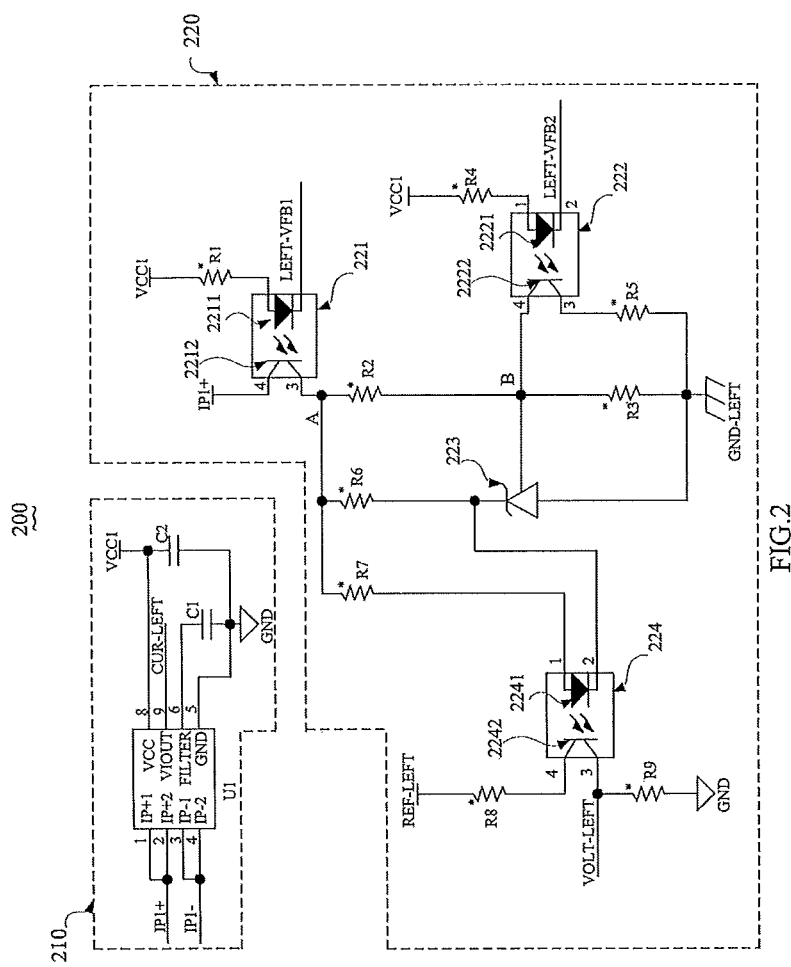
FIG. 2 is a schematic view of a voltage and current isolated acquisition unit according to an embodiment of the present disclosure.

Referring to FIG. 2, a schematic view of a voltage and current isolated acquisition unit according to an embodiment of the present disclosure is shown therein. Both the first voltage and current isolated acquisition unit 130 and the second voltage and current isolated acquisition unit 140 shown in FIG. 1 may adopt this structure. Herein, the first voltage and current isolated acquisition unit 130 shown in FIG. 1 is taken as an example for specific description.

As shown in FIG. 2, the voltage and current isolated acquisition unit 200 comprises a current isolated acquisition unit 210 and a voltage isolated acquisition unit 220. The current isolated acquisition unit 210 is configured to isolate and sample the current at the first port 110 shown in FIG. 1 and convert the sampled current into an isolated voltage bias signal CUR_LEFT; and the voltage isolated acquisition unit 220 is configured to isolate and sample the voltage at the first port 110 shown in FIG. 1 and convert the sampled voltage into a voltage feedback signal VOLT_LEFT.

The current isolated acquisition unit 210 comprises a current sensor U1 based on the Hall effect (e.g., a commonly used ACS712) to convert a current into an isolated voltage bias signal CUR_LEFT. The voltage amplitude of the voltage bias signal CUR_LEFT is linearly proportional to the current flowing through the current sensor U1.

Specifically, the current sensor U1 comprises a first high voltage port IP+1, a second high voltage port IP+2, a first low voltage port IP−1, a second low voltage port IP−2, a power source port VCC, an output port VIOUT, a filter port FILTER, and a grounded port GND. The first high voltage port IP+1 and the second high voltage port IP+2 are connected with each other and serve as one port of the voltage and current isolated acquisition unit 200 to receive a first sampled voltage IP1+ (i.e., connected to the first filtering-circuit unit 130 as shown in FIG. 1). The first low voltage port IP−1 and the second low voltage port IP−2 are connected with each other and serve as one port of the voltage and current isolated acquisition unit 200 to receive a second sampled voltage IP1− (i.e., connected to the first EMI filter unit 181 as shown in FIG. 1). The grounded port GND is grounded, the filter port FILTER is connected to the grounded port GND via a capacitor C1, the power source port VCC is connected to the first power source VCC1 (e.g., +5V) and connected to the grounded port GND via a capacitor C2, and the output port VIOUT is configured to output the voltage bias signal CUR_LEFT.

When no current flows from the first sampled voltage IP1+ to the second sampled voltage IP1−, the voltage bias signal CUR_LEFT is a fixed bias voltage and represents that the current is zero. When a current flows from the first sampled voltage IP1+ to the second sampled voltage IP1−, the voltage of the voltage bias signal CUR_LEFT is higher than the fixed bias voltage. When a current flows from the second sampled voltage IP1− to the first sampled voltage IP1+, the voltage of the voltage bias signal CUR_LEFT is lower than the fixed bias voltage.

The voltage isolated acquisition unit 220 comprises a first optical coupler 221, a second optical coupler 222, a programmable reference source 223 and a third optical coupler 224.

The first optical coupler 221 comprises a light emitting element 2211 and an photoelectric switch 2212. One terminal of the light emitting element 2211 is connected to a first power source VCC1 via a first resistor R1 and another terminal thereof is adapted to receive a third control signal LEFT_VFB1. A control terminal of the photoelectric switch 2212 is coupled with the light emitting element 2212, a route terminal of the photoelectric switch 2212 is connected to a first sampled voltage and another route terminal thereof is grounded via a second resistor R2 and a third resistor R3, wherein another route terminal is used as a first node A, and a connection between the second resistor R2 and the third resistor R3 is used as a second node B.

The second optical coupler 222 comprises a light emitting element 2221 and an photoelectric switch 2222. One terminal of the light emitting element 2221 is connected to the first power source VCC1 via a fourth resistor R4 and another terminal thereof is adapted to receive a fourth control signal LEFT_VFB2. A control terminal of the photoelectric switch 2222 is coupled with the light emitting element 2221, a route terminal of the photoelectric switch 2222 is connected to the second node B and another route terminal thereof is grounded via a fifth resistor R5.

The programmable reference source 223 may adopt the commonly used TL431 chip, and a terminal thereof is connected to the first node A via a sixth resistor R6, another terminal thereof is grounded, and a control terminal thereof is connected to the second node B.

The third optical coupler 224 comprises a light emitting element 2241 and an photoelectric switch 2242. One terminal of the light emitting element 2241 is connected to the first node A via a seventh resistor R7, and another terminal thereof is connected to a connection between the sixth resistor R6 and the programmable reference source 223. A control terminal of the photoelectric switch 2242 is coupled with the light emitting element 2241, one route terminal of the photoelectric switch 2242 is connected via an eighth resistor R8 to a fixed reference voltage REF_LEFT generated by the first PWM controlling unit 151 shown in FIG. 1 (reference can be made to subsequent descriptions), and another route terminal thereof is grounded via a ninth resistor R9 and used as an output terminal of the voltage isolated acquisition unit 200 to output the voltage feedback signal VOLT_LEFT.

The third control signal LEFT_VFB1 and the fourth control signal LEFT_VFB2 are controlled and output by the programmable device, e.g., an MCU or a CPLD, of the processing module 150 shown in FIG. 1.

When the third control signal LEFT_VFB1 is a high level, the light emitting element 2211 of the first optical coupler 221 does not emit light, the photoelectric switch 2212 is turned off, i.e., the first optical coupler 221 is turned off. Because the first optical coupler 221 is turned off, the light emitting element 2241 of the third optical coupler 224 does not emit light, the photoelectric switch 2242 is turned off, i.e., the third optical coupler 221 is also turned off.

When the third control signal LEFT_VFB1 is a low level and the fourth control signal LEFT_VFB2 is a high level, the first optical coupler 221 is turned on and the second optical coupler 222 is turned off. After the first optical coupler 221 is turned on, the first sampled voltage IP1+ supplies power to the programmable reference source 223 via the photoelectric switch 2212 of the conductive first optical coupler 221 and the sixth resistor R6. Furthermore, because the photoelectric switch 2212 of the first optical coupler 221 is turned on, the second resistor R2 and the third resistor R3 are connected between the first sampled voltage IP1+ and the ground to divide the voltage, and the divided voltage at the second node B is input into the control terminal of the programmable reference source 223. Because the programmable reference source 223 has a voltage error comparator integrated therein, when the divided voltage at the second node B is lower than the comparison threshold thereof, the programmable reference source 223 is turned on to ground the voltage between the programmable reference source 223 and the connection between the sixth resistor R6 and the light emitting element 2241 of the third optical coupler 224. Therefore, the voltage at the first node A is discharged via the circuit formed by the seventh resistor R7, the light emitting element 2241 of the third optical coupler 224 and the conductive programmable reference source 223. Thus, the light emitting element 2241 of the third optical coupler 224 emits light, the photoelectric switch 2242 is turned on, i.e., the third optical coupler 224 is turned on so that the voltage feedback signal VOLT_LEFT is raised to a high level via the eighth resistor R8. When the divided voltage at the second node B is higher than the comparison threshold thereof, the programmable reference source 223 is turned off. Therefore, the seventh resistor R7, the light emitting element 2241 of the third optical coupler 224 and the programmable reference source 223 which is turned off can not form a circuit. Thus, the light emitting element 2241 can not emit light, the photoelectric switch 2242 is turned off, i.e., the third optical coupler 224 is turned off so that the voltage feedback signal VOLT_LEFT drops to a low level via the ninth resistor R9. After the aforesaid process is balanced, the voltage at the first node A remains stable, i.e., the voltage at the first sampled voltage IP1+ remains stable.

During the aforesaid process, when the fourth control signal LEFT_VFB2 is also a low level, the second optical coupler 220 is turned on, so the fifth resistor R5 and the third resistor R3 are connected in parallel. In this way, the divided voltage value at the second node B is changed so that the stable voltage value at the first node A, i.e., the stable voltage value at the first sampled voltage IP1+, can be changed.

Furthermore, as those skilled in the art will understand, the aforesaid description about the voltage and current isolated acquisition unit 200 takes the first voltage and current isolated acquisition unit 130 of FIG. 1 as an example, but the second voltage and current isolated acquisition unit 140 of FIG. 1 also has the same structure and working principle as long as related signals and the connection relationship thereof are changed correspondingly.

Figure 3:
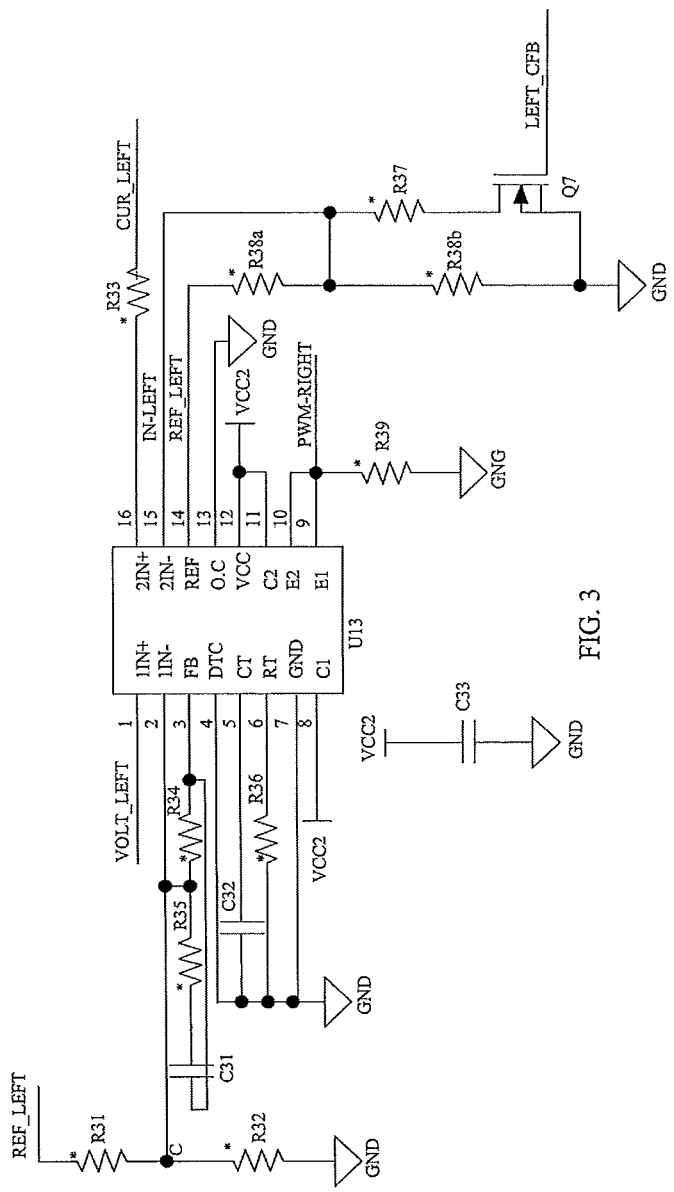
FIG. 3 is a schematic view of a PWM controlling unit according to an embodiment of the present disclosure.

Referring to FIG. 3, a schematic view of a PWM controlling unit according to an embodiment of the present disclosure is shown therein. Both the first PWM controlling unit 151 and the second PWM controlling unit 152 shown in FIG. 1 can adopt this structure. Herein, the second PWM controlling unit 152 of FIG. 1 is taken as an example for specific description.

As shown in FIG. 3, the PWM controlling unit 300 of the present disclosure mainly comprises a PWM controller U13, which has two error amplifiers integrated therein and is adapted to provide the fixed reference voltage REF_LEFT, e.g., the commonly used TL594 chip.

Specifically, the PWM controller U13 comprises sixteen ports, i.e., a port 1IN+, a port 1IN−, a port 2IN+, a port 2IN−, a port FB, a port DTC, a port CT, a port RT, a port GND, a port C1, a port REF, a port O.C, a port VCC, a port C2, a port E2, and a port E1.

The fixed reference voltage REF_LEFT is grounded via a resistor R31 and a resistor R32, and the connection between the resistor R31 and the resistor R32 is defined as a node C.

The port 1IN+ receives the aforesaid voltage feedback signal VOLT_LEFT, the port 2IN+ receives the voltage bias signal CUR_LEFT via a resistor R33, and the port 1IN− is connected with the node C. The port FB is connected with the circuit formed by a resistor R34, a resistor R35 and a capacitor C31, and the node between the resistor R34 and the resistor R35 is further connected with the port 1IN−. The port DTC is grounded. The port CT is grounded via a capacitor C32. The port RT is grounded via a resistor R36. The port GND is grounded. The port C1 is connected with a second power source VCC2, and the second power source VCC2 is grounded via a capacitor C33. The port 2IN− is connected to a route terminal of a transistor Q1 via a resistor R37, and the control terminal of the transistor Q1 receives one control signal LEFT_CFB. The control signal LEFT_CFB may be controlled and output by the programmable device of the processing module 150 shown in FIG. 1, e.g., an MCU or a CPLD. Another route terminal of the transistor Q1 is grounded. The port REF outputs a fixed reference voltage REF_LEFT. Via a resistor R38a and a resistor R38b, the port REF is connected with another route terminal of the transistor Q1 and is grounded. The port O.C is grounded. The port VCC and the port C2 are connected together and connected to the second power source VCC2. The port E2 and the port E1 are connected together and are grounded via a resistor R39, and the port E2 and the port E2 are configured to output a pulse width modulation signal PWM_RIGHT.

The fixed reference voltage REF_LEFT is a fixed reference voltage generated by the PWM controller U13, and is divided through the resistor R31, the resistor R32, a resistor R43, and a resistor R51 to serve as the comparison thresholds of the voltage error comparator and the current error comparator inside the PWM controller U13 respectively.

When the control signal LEFT_CFB is a high level, the transistor Q1 is turned on. After the transistor Q1 is turned on, the resistor R37 and the resistor R38b are connected in parallel. Thus, the comparison threshold of the current error comparator is changed so that the stable value of the voltage bias signal CUR_LEFT is changed, i.e., the stable current value between the first sampled voltage IP1+ and the second sampled voltage IP1− shown in FIG. 2 is changed.

Furthermore, as those skilled in the art will understand, the aforesaid description about the PWM controlling unit 300 takes the second PWM controlling unit 152 of FIG. 1 as an example, but the first PWM controlling unit 151 of FIG. 1 also has the same structure and working principle as long as related signals are changed correspondingly.

Figure 4:
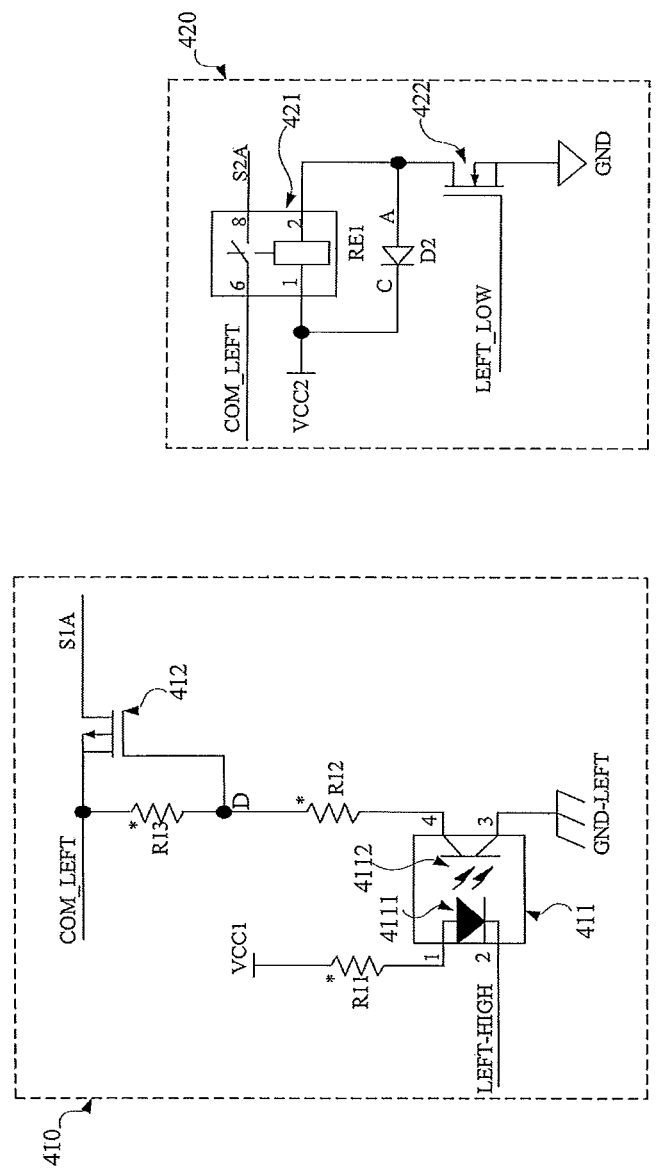
FIG. 4 is a schematic view illustrating switches of a first switch assembly and switches of a second switch assembly according to an embodiment of the present disclosure.

Referring to FIG. 4, a schematic view illustrating switches of a first switch assembly and switches of a second switch assembly according to an embodiment of the present disclosure is shown therein. Both the first left-path switch 1721 and the first right-path switch 1722 of the first switch assembly 172 shown in FIG. 1 can adopt the structure of a first switch 410 shown in FIG. 4, and both the second left-path switch 1731 and the second right-path switch 1732 of the second switch assembly 173 shown in FIG. 1 can adopt the structure of a first switch 420 shown in FIG. 4. Herein, the first left-path switch 1721 and the second left-path switch 1731 of FIG. 1 are taken as an example for specific descriptions.

As shown in FIG. 4, the first switch 410 comprises a fourth optical coupler 411 and a switch element 412. The fourth optical coupler 411 comprises a light emitting element 4111 and an photoelectric switch 4112, one terminal of the light emitting element 4111 is connected to the first power source VCC1 via an eleventh resistor R11, and another terminal thereof is adapted to receive a corresponding control signal from the first pair of control signals, i.e., the first left-side control signal LEFT_HIGH. A control terminal of the photoelectric switch 4112 is coupled with the light emitting element 4111, one route terminal of the photoelectric switch 4112 is grounded, another route terminal thereof is connected via a twelfth resistor R12 and a thirteenth resistor R13 to the first filtering-circuit unit 130, i.e., the node COM_LEFT of FIG. 1, as a port of the bidirectional power-converting module shown in FIG. 1. A control terminal of the switch element 412 is connected to a node D between the twelfth resistor R12 and a thirteenth resistor R13, a route terminal of the switch element 412 is connected to the first filtering-circuit unit 130 of FIG. 1, i.e., the node COM_LEFT of FIG. 1, and another route terminal thereof is connected to a terminal of the first left-side winding 1711 of the first pair of windings 171a shown in FIG. 1, i.e., the node S1A shown in FIG. 1.

When the first left-side control signal LEFT_HIGH is a low level, the light emitting element 4111 of the fourth optical coupler 411 emits light, the photoelectric switch 4112 is turned on, i.e., the fourth optical coupler 411 is turned on. At this point, after the voltage at the node COM_LEFT is divided via the circuit formed by the thirteenth resistor R13, the twelfth resistor R12 and the conductive photoelectric switch 4112, the thirteenth resistor R13 and the twelfth resistor R12, the divided voltage at the node D is higher than the threshold voltage of the switch element 412. Therefore, the switch element 412 is turned on, and the voltage at the node COM_LEFT is transferred to the node S1A via the conductive switch element 412, i.e., to the first left-side winding 1711 of the first pair of windings 171a.

When the first left-side control signal LEFT_HIGH is a high level, the light emitting element 4111 of the fourth optical coupler 411 does not emit light, and the photoelectric switch 4112 is turned off, i.e., the fourth optical coupler 411 is turned off Therefore, the thirteenth resistor R13, the twelfth resistor R12 and the photoelectric switch 4112 which is turned off can not form a circuit, the voltage at the node D is lower than the threshold voltage of the switch element 412 so that the switch element 412 is turned off.

The second switch 420 comprises a relay 421 and a switch element 422. The relay 421 is connected between the first filtering-circuit unit 130 of FIG. 1 (i.e., the node COM_LEFT of FIG. 1) and the second left-side winding 1715 of the second pair of windings 171b (i.e., the node S2A of FIG. 1). A control terminal of the switch element 422 is adapt to receive a corresponding control signal from the second pair of control signals, (i.e., the second left-side control signal LEFT_LOW), one route terminal of the switch element 422 is grounded, and another route terminal thereof is connected to the relay 421.

When the second left-side control signal LEFT_LOW is a high level, the switch element 422 is turned on. Therefore, the relay 421 is turned on, and the node COM_LEFT is connected with the node S2A so that the node COM_LEFT is transferred to the node S2A. When the second left-side control signal LEFT_LOW is a low level, the switch element 422 is turned off. Therefore, the relay 421 is turned off, and the node COM_LEFT and the node S2A are disconnected from each other.

Furthermore, as those skilled in the art will understand, the aforesaid description about the first switch 410 and the second switch 420 takes the first left-path switch 1721 and the second left-path switch 1731 of FIG. 1 as an example, but the first right-path switch 1722 and the second right-path switch 1732 of FIG. 1 also has the same structure and working principle as long as related signals and the connection relationship thereof are changed correspondingly.

According to the above descriptions, the bidirectional isolated DC-DC converter 100 of the present disclosure has a symmetric structural design and a very simple and artful structure, and is compatible with voltage conversion between battery units within a high-voltage battery pack and voltage conversion between high-voltage battery packs connected in series or voltage conversion between a high-voltage battery pack and an auxiliary power source, so it has wider applicability. Furthermore, the bidirectional isolated DC-DC converter 100 of the present disclosure can achieve a constant voltage and a constant current at both sides, and can automatically change the constant voltage value and the constant current value depending on the needs, so it has better utility. Moreover, not only the input end and the output end thereof are isolated, the associated sampling unit and the controlling unit are also isolated, so the interference immunity and the reliability become higher and the electromagnetic compatibility is improved.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A bidirectional isolated DC-DC (direct current to direct current) converter, comprising:
   a first port;
   a second port, wherein one of the first port and the second port is selectively used as an input terminal of the bidirectional isolated DC-DC converter, and another of the first port and the second port is used as an output terminal of the bidirectional isolated DC-DC converter correspondingly;

a first voltage and current isolated acquisition unit, connected with the first port to sample voltages and currents at the first port and generate a corresponding feedback signal;

a second voltage and current isolated acquisition unit, connected with the second port to sample voltages and currents at the second port and generate another corresponding feedback signal;

a processing module, connected with the first voltage and current isolated acquisition unit and the second voltage and current isolated acquisition unit, to receive feedback signals generated by the first voltage and current isolated acquisition unit and the second voltage and current isolated acquisition unit, and output corresponding control signals according to the feedback signals;

a first filtering-circuit unit, connected to the first port via the first voltage and current isolated acquisition unit;

a second filtering-circuit unit, connected to the second port via the second voltage and current isolated acquisition unit; and a bidirectional power-converting module, connected with the processing module, connected to the first port via the first filtering-circuit unit and the first voltage and current isolated acquisition unit, and connected to the second port via the second filtering-circuit unit and the second voltage and current isolated acquisition unit, wherein the bidirectional power-converting module is configured to perform the conversion of different voltages between the first port and the second port according to the control signals outputted from the processing module.

2. The bidirectional isolated DC-DC converter of claim 1, further comprising:

a first electromagnetic interference filter unit, connected between the first port and the first voltage and current isolated acquisition unit; and a second electromagnetic interference filter unit, connected between the second port and the second voltage and current isolated acquisition unit.

3. The bidirectional isolated DC-DC converter of claim 2, wherein the bidirectional power-converting module comprises:

a transformer, at least comprising a first pair of windings and a second pair of windings, wherein the first pair of windings comprises a first left-side winding and a first right-side winding, and the second pair of windings comprises a second left-side winding and a second right-side winding;

a first switch assembly, configured to control whether the first pair of windings operates, wherein the first switch assembly comprises a first left-path switch and a first right-path switch, a terminal of the first left-side winding of the first pair of windings is connected to the first filtering-circuit unit via the first left-path switch, and a terminal of the first right-side winding of the first pair of windings is connected to the second filtering-circuit unit via the first right-path switch;

a second switch assembly, configured to control whether the second pair of windings operates, wherein the second switch assembly comprises a second left-path switch and a second right-path switch, a terminal of the second left-side winding of the second pair of windings is connected to the first filtering-circuit unit via the second left-path switch, and a terminal of the second right-side winding of the second pair of windings is connected to the second filtering-circuit unit via the second right-path switch;

a first control switch, comprising a first route terminal, a second route terminal and a control terminal, wherein another terminal of the first left-side winding of the first pair of windings and another terminal of the second left-side winding of the second pair of windings are connected to the first route terminal of the first control switch respectively, and the second route terminal of the first control switch is grounded;

a first driving unit, connected with the control terminal of the first control switch to control whether turning on a path between the first route terminal and the second route terminal of the first control switch;

a first diode, connected in anti-parallel between the first route terminal and the second route terminal of the first control switch;

a second control switch, comprising a first route terminal, a second route terminal and a control terminal, wherein another terminal of the first right-side winding of the first pair of windings and another terminal of the second right-side winding of the second pair of windings are connected to the first route terminal of the second control switch respectively, and the second route terminal of the second control switch is grounded;

a second driving unit, connected with the control terminal of the second control switch to control whether turning on a path between the first route terminal and the second route terminal of the second control switch;

a second diode, connected in anti-parallel between the first route terminal and the second route terminal of the second control switch;

wherein the control signals outputted from the processing module comprise a first pair of control signals, a second pair of control signals, a first pulse width modulation (PWM) signal and a second PWM signal, the first switch assembly receives the first pair of control signals to control whether the first pair of windings operate, the second switch assembly receives the second pair of control signals to control whether the second pair of windings operate; the first driving unit receives the first PWM signal to control whether turning on the path between the first route terminal and the second route terminal of the first control switch according to the first PWM signal, and the second driving unit receives the second PWM signal to control whether turning on the path between the first route terminal and the second route terminal of the second control switch according to the second PWM signal.

4. The bidirectional isolated DC-DC converter of claim 3, wherein the bidirectional power-converting module further comprises:

a first absorbing unit, connected in parallel between the first route terminal and the second route terminal of the first control switch; and a second absorbing unit, connected in parallel between the first route terminal and the second route terminal of the second control switch.

5. The bidirectional isolated DC-DC converter of claim 4, wherein the processing module comprises:

a first PWM controlling unit, connected with the second voltage and current isolated acquisition unit, to receive the feedback signal generated by the second voltage and current isolated acquisition unit and output the first PWM signal to the first driving unit; and a second PWM controlling unit, connected with the first voltage and current isolated acquisition unit, to receive the feedback signal generated by the first voltage and current isolated acquisition unit and output the second PWM signal to the second driving unit.

6. The bidirectional isolated DC-DC converter of claim 5, wherein each of the first voltage and current isolated acqui sition unit and the second voltage and current isolated acquisition unit respectively comprises:

a current isolated acquisition unit, configured to isolate and sample the currents at the first port or the second port and convert the sampled currents into an isolated voltage bias signal; and a voltage isolated acquisition unit, configured to isolate and sample the voltages at the first port or the second port and convert the sampled voltages into a voltage feedback signal.

7. The bidirectional isolated DC-DC converter of claim 6, wherein the current isolated acquisition unit comprises a current sensor based on the Hall effect, and the voltage isolated acquisition unit comprises:

a first optical coupler, comprising:
   a light emitting element, of which one terminal is connected to a first power source via a first resistor and another terminal is adapted to receive a third control signal;
   a photoelectric switch, of which a control terminal is photo-coupled with the light emitting element, a route terminal is connected to a first sampled voltage and another route terminal is grounded via a second resistor and a third resistor, wherein the another route terminal thereof is also used as a first node, and a connection between the second resistor and the third resistor is used as a second node;

a second optical coupler, comprising:
   a light emitting element, of which one terminal is connected to the first power source via a fourth resistor and another terminal is adapted to receive a fourth control signal;
   a photoelectric switch, of which a control terminal is photo-coupled with the light emitting element, a route terminal is connected to the second node and another route terminal is grounded via a fifth resistor;

a programmable reference source, of which a terminal is connected to the first node via a sixth resistor, another terminal is grounded, and a control terminal is connected to the second node;

a third optical coupler, comprising:
   a light emitting element, of which one terminal is connected to the first node via a seventh resistor, and another terminal is connected to a connection between the sixth resistor and the programmable reference source;
   a photoelectric switch, of which a control terminal is photo-coupled with the light emitting element, one route terminal is connected via an eighth resistor to a fixed reference voltage generated by the first PWM controlling unit or the second PWM controlling unit, and another route terminal is grounded via a ninth resistor and used as an output terminal of the voltage isolated acquisition unit to output the voltage feedback signal.

8. The bidirectional isolated DC-DC converter of claim 7, wherein each of the first PWM controlling unit and the second PWM controlling unit respectively comprises:

a PWM controller, having two error amplifiers integrated therein and adapted to provide the fixed reference voltage.

9. The bidirectional isolated DC-DC converter of claim 8, wherein each of the first left-path switch and the first right-path switch of the first switch assembly comprises:

a fourth optical coupler, comprising:
   a light emitting element, of which one terminal is connected to the first power source via an eleventh resistor, and another terminal is adapted to receive a corresponding control signal from the first pair of control signals; and
   a photoelectric switch, of which a control terminal is photo-coupled with the light emitting element, one route terminal is grounded, another route terminal is connected to the first filtering-circuit unit and the second filtering-circuit unit via a twelfth resistor and a thirteenth resistor, one terminal of the thirteenth resistor far away from the twelfth resistor is used as a port of the bidirectional power-converting module for connecting with the first filtering-circuit unit and the second filtering-circuit unit; and a switch element, of which a control terminal is connected to a node between the twelfth resistor and the thirteenth resistor, one route terminal is connected to the first filtering-circuit unit or the second filtering-circuit unit, and another route terminal is connected to one terminal of the first left-side winding or the first right-side winding of the first pair of windings.

10. The bidirectional isolated DC-DC converter of claim 9, wherein each of the second left-path switch and the second right-path switch in the second switch assembly respectively comprises:

a relay, connected between the first filtering-circuit unit or the second filtering-circuit unit and the second left-side winding or the second right-side winding of the second pair of windings; and a switch element, of which a control terminal is adapted to receive a corresponding control signal of the second pair of control signals, one route terminal is grounded and another route terminal is connected to the relay.

11. A bidirectional isolated DC-DC converter, comprising:

two ports, wherein one of the two ports is selectively used as an input terminal of the bidirectional isolated DC-DC converter, and another of the two ports is used as an output terminal of the bidirectional isolated DC-DC converter correspondingly;

two voltage and current isolated acquisition units, connected with the two ports respectively, to sample voltages and currents at the two ports and generate corresponding feedback signals respectively;

a processing module, connected with the two voltage and current isolated acquisition units, to receive the feedback signals generated from the two voltage and current isolated acquisition units, and output corresponding control signals according to the feedback signals;

a bidirectional power-converting module, connected with the processing module, and connected to the two ports via the two voltage and current isolated acquisition units respectively, wherein the bidirectional power-converting module is configured to perform the conversion of different voltages between the two ports according to the control signals outputted from the processing module;

two filtering-circuit units, connected to the two ports via the two voltage and current isolated acquisition units respectively; and two electromagnetic interference filter units, connected between the two ports and the two voltage and current isolated acquisition units respectively;

wherein the two ports and the two voltage and current isolated acquisition units are symmetric respectively with respect to the bidirectional power-converting module.

12. The bidirectional isolated DC-DC converter of claim 11, wherein the bidirectional power-converting module comprises:

a transformer, at least comprising two left-side windings and two right-side windings, the two left-side windings are magnetically-coupled with the two right-side windings respectively;

two left-path switches, each thereof having one terminal connected to one terminal of a corresponding one of the two left-side windings respectively, and another terminal connected to one of the two filtering-circuit units;
two right-path switches, each thereof having one terminal connected to one terminal of a corresponding one of the two right-side winding respectively, and another terminal connected to another of the two filtering-circuit units;
two control switches, each thereof comprising two route terminals and a control terminal, wherein another terminals of the two left-side windings are connected together and connected to one route terminal of a corresponding one of the two control switches, another terminals of the two right-side windings are connected together and connected to one route terminal of another of the two control switches, and another route terminals of the two control switches are grounded respectively;
two driving units, connected to control terminals of the two control switches respectively, to control whether the two control switches are turned on respectively;
two diodes, connected in anti-parallel between the two router terminals of the two control switches respectively;
wherein the two left-side windings are symmetric with the two right-side windings respectively, the two left-path switches are symmetric with the two right-path switches, and the two control switches, the two driving units and the two diodes are symmetric respectively;
wherein the control signals outputted from the processing module at least two left control signals, two right control signals, and two pulse width modulation (PWM) signals; the two left control signals are transmitted to the two left-path switches respectively to control whether the two left-path switches are turned on respectively, and the two left control signals are opposite with each other; the two right control signals are transmitted to the two right-path switches respectively to control whether the two right-path switches are turned on respectively, and the two right control signals are opposite with each other; and the two PWM signals are transmitted to the two driving units respectively such that the two driving units control whether the two control switches are turned on respectively according to the two PWM signals respectively.

13. The bidirectional isolated DC-DC converter of claim 12, wherein the bidirectional power-converting module further comprises:
two absorbing units, connected in parallel between the two terminals of the two control switches respectively.

14. The bidirectional isolated DC-DC converter of claim 13, wherein the processing module comprises:
two PWM controlling unit, connected with the two voltage and current isolated acquisition unit respectively, to receive the feedback signals generated by the two voltage and current isolated acquisition units respectively and output the two PWM signals to the two driving units respectively.

15. The bidirectional isolated DC-DC converter of claim 14, wherein each of the two voltage and current isolated acquisition units comprises:
a current isolated acquisition unit, configured to isolate and sample the currents at the two ports respectively, and convert the sampled currents into an isolated voltage bias signal;
a voltage isolated acquisition unit, configured to isolated and sample the currents at the two ports respectively, and convert the sampled voltages into a voltage feedback signal.

16. The bidirectional isolated DC-DC converter of claim 15, wherein the current isolated acquisition unit comprises a current sensor based on the Hall effect, and the voltage isolated acquisition unit comprises:
a first optical coupler, comprising:
a light emitting element, of which one terminal is connected to a first power source via a first resistor and another terminal is adapted to receive a third control signal;
a photoelectric switch, of which a control terminal is photo-coupled with the light emitting element, a route terminal is connected to a first sampled voltage, and another route terminal is grounded via a second resistor and a third resistor, wherein the another route terminal thereof is also used as a first node, and a connection between the second resistor and the third resistor is used as a second node;
a second optical coupler, comprising:
a light emitting element, of which one terminal is connected to the first power source via a fourth resistor and another terminal is adapted to receive a fourth control signal;
a photoelectric switch, of which a control terminal is photo-coupled with the light element, a route terminal is connected to the second node, and another route terminal is grounded via a fifth resistor;
a programmable reference source, of which a terminal is connected to the first node via a sixth resistor, another terminal is grounded, and a control terminal is connected to the second node;
a third optical coupler, comprising:
a light emitting element, of which one terminal is connected to the first node via a seventh resistor, and another terminal is connected to a connection between the sixth resistor and the programmable reference source;
a photoelectric switch, of which a control terminal is photo-coupled with the light emitting element, one route terminal is connected via an eighth resistor to a fixed reference voltage generated by the two PWM controlling units, and another route terminal is grounded via a ninth resistor and used as an output terminal of the voltage isolated acquisition unit to output the voltage feedback signal.

17. The bidirectional isolated DC-DC converter of claim 16, wherein each of the two PWM controlling units comprises:
a PWM controller, having two error amplifiers integrated therein and adapted to provide the fixed reference voltage.

18. The bidirectional isolated DC-DC converter of claim 17, wherein one of the two left-path switches and corresponding one of the two right-path switches, respectively, comprises:
a fourth optical coupler, comprising:
a light emitting element, of which one terminal is connected to the first power source via an eleventh resistor, and another terminal is adapted to receive a corresponding one of the two left control signals or a corresponding one of the two right control signals; and
a photoelectric switch, of which a control terminal is photo-coupled with the light emitting element, one route terminal is grounded, another route terminal is connected to one of the two filtering-circuit units via a twelfth resistor and a thirteenth resistor, one terminal of the thirteenth resistor far away from the twelfth resistor is used as a port of the bidirectional power-converting module for connecting with one of the two filtering-circuit units; and a switch element, of which a control terminal is connected to a node between the twelfth resistor and the thirteenth resistor, one route terminal is connected to one of the two filtering-circuit units, and another route terminal is connected to one terminal of a corresponding one of the two left-side windings or a corresponding one of the two right-side windings.

19. The bidirectional isolated DC-DC converter of claim 18, wherein another of the two left-path switches and corresponding another of the two right-path switches, respectively, comprises:

a relay, connected between one of the two filtering-circuit units and corresponding another of the two left-side windings or corresponding another of the two right-side windings; and a switch element, of which a control terminal is adapted to receive another of the two left control signals or another of the two right control signals, one route terminal is grounded and another route terminal is connected to the relay.

* * * * *